United States Patent
Koo et al.

(10) Patent No.: US 7,865,621 B1
(45) Date of Patent: Jan. 4, 2011

(54) OPEN SETTLEMENT PROTOCOL BRIDGE FOR MULTI-NETWORK VOICE CONNECTIONS

(75) Inventors: Kang Wee Koo, San Jose, CA (US); Wee Sin Tam, Singapore (SG); Srinivas Shesham, Melbourne (AU); Pawan Pandey, Singapore (SG); Sin Ming Ow, Singapore (SG)

(73) Assignee: Spice i2i Limited, Singapore (SG)

( * ) Notice: Subject to any disclaimer, the term of this patent is extended or adjusted under 35 U.S.C. 154(b) by 2337 days.

(21) Appl. No.: 10/159,166

(22) Filed: May 31, 2002

Related U.S. Application Data (60) Provisional application No. 60/348,923, filed on Oct. 26, 2001.

(51) Int. Cl.
  *G06F 15/173* (2006.01)
  *G06F 15/16* (2006.01)
(52) U.S. Cl. .................. 709/249; 709/223; 709/227
(58) Field of Classification Search .............. 709/223, 709/227, 249
  See application file for complete search history.

(56) References Cited

U.S. PATENT DOCUMENTS 6,970,930 B1 * 11/2005 Donovan .................. 709/227

2004/0022237 A1 * 2/2004 Elliott et al. ............... 370/356

OTHER PUBLICATIONS

Appendix A: Open Settlements Protocol (OSP) Clearinghouse Solution; [online], [retrieved on Dec. 19, 2001]; Retrieved from the Internet: <URL: http://www.cisco.com/univercd/cc/td/doc/product/access/sc/rel7/soln/wv_rell/wvov/app_a.h.html>: pp. 1-4.

Telecommunications and Internet Protocol Harmonization Over Networks (TIPHON); Open Settlement Protocol (OSP) for Inter-Domain Pricing, Authorization, and Usage Exchange; European Telecommunications Standards Institute TS 101 321 v2.1.1 (Aug. 2000); France; 117 pages.

* cited by examiner

*Primary Examiner*—Nabil El-Hady
*Assistant Examiner*—Tanim Hossain
(74) *Attorney, Agent, or Firm*—Fenwick & West LLP (57) ABSTRACT

A bridge for multi-network communications is provided. A voice bridge includes an open settlement protocol (OSP) compliant interface for establishing inter-domain voice connections. The voice bridge facilitates connections between OSP compliant and non-OSP compliant networks and interfaces with an OSP server. A call set-up component processes requests from OSP compliant and non-OSP compliant networks. An OSP interface facilitates OSP compliant reporting to the OSP server. Other embodiments comprising additional features, such as address masking, are also provided.

43 Claims, 10 Drawing Sheets

OPEN SETTLEMENT PROTOCOL BRIDGE FOR MULTI-NETWORK VOICE CONNECTIONS

CROSS-REFERENCE TO RELATED APPLICATION

This application is related to provisional patent application Ser. No. 60/348,923, filed Oct. 26, 2001, entitled "OSP Bridge for Multi-Network Voice Connections" from which priority is claimed under 35 U.S.C. §119(e) and which application is incorporated herein by reference in its entirety.

BACKGROUND

A. Technical Field

The present invention relates generally to voice communication across multiple networks, and more particularly, to providing a voice bridge that allows non-open settlement protocol (OSP) networks to interface with an OSP server and establish connections with both OSP and non-OSP networks.

B. Background of the Invention

The popularity of Voice over Internet Protocol (VoIP) is continually increasing. VoIP systems provide telephone connections by transmitting audio packets between two telephone devices via a packet-switched network (e.g., TCP/IP network). This increase in VoIP popularity is primarily due to two reasons: the relatively inexpensive cost and the increase in quality of VoIP communication.

VoIP allows service providers to offer long-distance services to clients at much lower rates than traditional phone companies. VoIP allows service providers a much more efficient use of networks than the traditional public switched telephone network used by the traditional phone companies. One reason for this increase in efficiency is the ability of VoIP to multiplex voice packets from multiple circuit-switched paths (i.e., telephone connections) together on a unified communications structure within a network. Thus, the bandwidth utilization increases within a packet switched network allowing more telephone connections to occur simultaneously.

A few years ago, the quality of a VoIP connection was lacking due primarily to packet delay occurring in the networks. This problem was primarily caused by the inefficiency of the Internet over which the VoIP connections occurred. Internet events such as bottlenecks and discarding packets reduced the quality of a conversation occurring across the Internet. However, the increase of large private networks, more controlled Internet backbones, and more efficient routing protocols have greatly reduced these problems. Thus, the quality of a VoIP telephone conversation today has drastically improved. As the popularity of VoIP continues to grow, other issues need to be addressed, such as systems that monitor call usage and authorization of VoIP connections between different networks. These systems are necessary to enable service providers to more effectively control and to monitor voice connections for purposes including client billing, network management, and expansion of network capacity.

Figure 1:
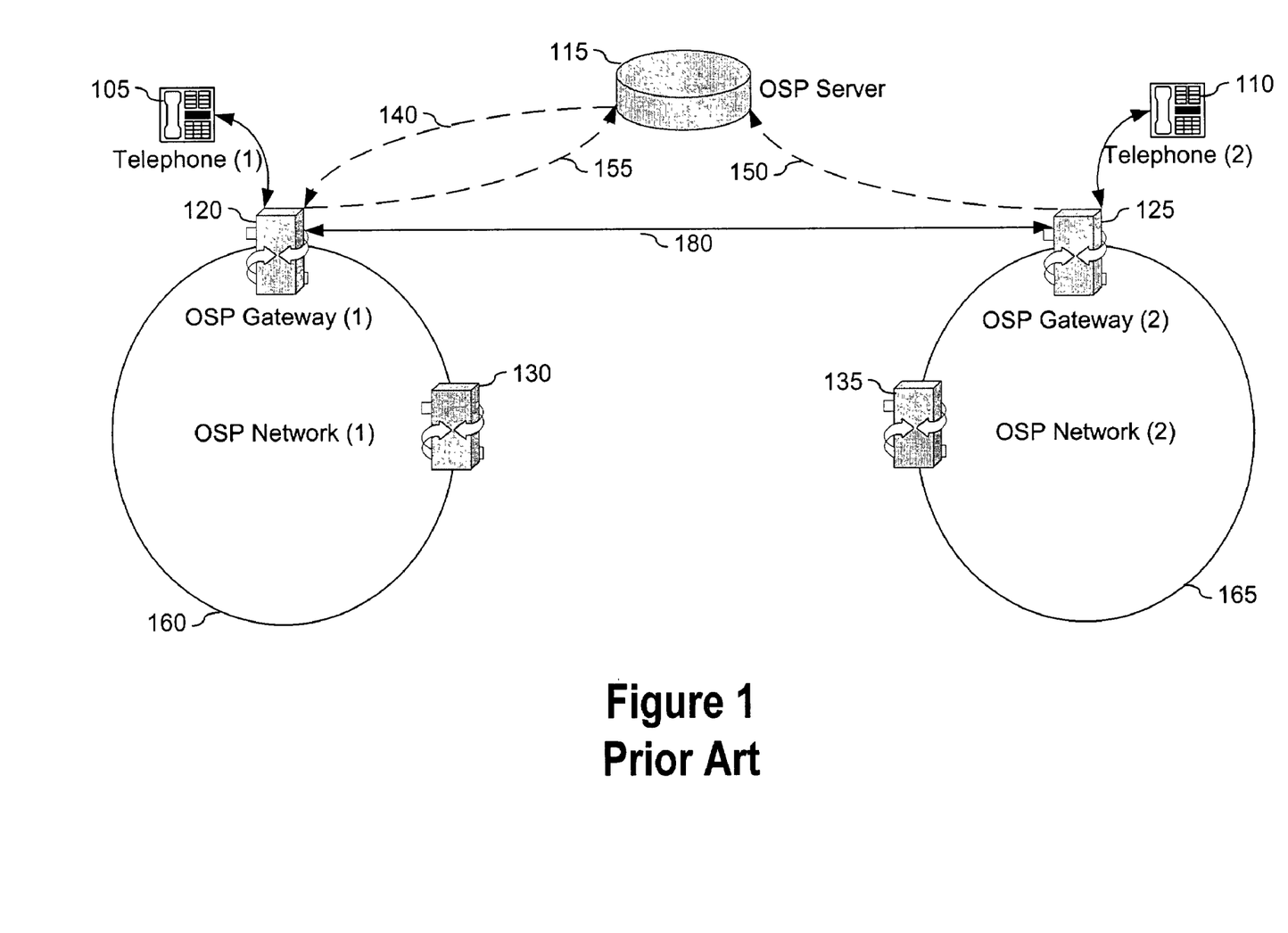
FIG. 1 is a prior art illustration of a VoIP connection between two OSP compatible networks.

Open Settlement Protocol (OSP) is a settlement protocol that provides call usage, authorization, routing and detail reporting among networking devices such as gateways, gatekeepers, and clearinghouse service providers. Technical specifications of the OSP protocol are described in "Open Settlement Protocol (OSP) for Inter-Domain pricing, authorization, and usage exchange," available from the European Telecommunications Standards Institute, publication number ETSI TS 101 321, version 2.1.1 dated 08/2000, which is hereby incorporated by reference in its entirety. FIG. 1 illustrates a typical VoIP connection implemented using OSP. A first telephone 105 initiates the VoIP connection by transmitting a request to a first OSP gateway 120. Generally, this request includes a destination telephone number for the VoIP connection. This destination telephone number may be a ten-digit number if it is within the United States or may correspond to a number in a foreign country. The first OSP gateway 120 resides within a first OSP network 160 that can communicate and interface with other OSP compatible devices. This first OSP network 160 may also contain other OSP gateways 130.

Upon receiving the request, the first OSP gateway 120 transmits an authorization request to an OSP server 115 via line 155. This request generally includes the destination telephone number received from the first telephone 105 and may be formatted in XML. The OSP server 115 translates information within the request and returns an authorization reply that may contain routing information and a first OSP token. The routing information may be formatted in XML and transmitted using Secure Sockets Layer (SSL). This routing information generally includes an Internet Protocol (IP) address to a second OSP gateway 125 or an IP address to an OSP gatekeeper (not shown). If the routing information corresponds to an OSP gatekeeper, then an IP address to the second OSP gateway 125 that terminates the connection is retrieved from the first OSP gateway 120. Typically, such an occurrence may be necessary when other gateways 125, 135 also reside on the second OSP network 165.

The first OSP token transmitted from the first OSP gateway 120 is usually encoded (most often in base64) and may also be encrypted depending on the design of the system. This first OSP token is generally an opaque data string and is passed between domains to ensure proper authorization and communication between devices. The first OSP token is used by the first OSP gateway 120 to offer a connection to the second OSP gateway 125. Additionally, the first OSP token is used by the second OSP gateway 125 to accept the connection offer.

After the IP address of the second OSP gateway 125 is received from the OSP server 115, the first OSP gateway 120 establishes a connection with the second OSP gateway 125. The first OSP gateway 120 establishes this connection by transmitting a connection request and the first OSP token to the second OSP gateway 125. Because the second OSP gateway 125 is OSP compatible, it is able to decode and decrypt (if necessary) the first OSP token and retrieve necessary OSP information to terminate the connection and interface with the OSP server 115 accordingly. This connection is established after the second OSP gateway 125 accepts the connection request offered by the first OSP gateway 120. Typically, communication on this connection will follow the International Telecommunication Union (ITU) H.323 standard.

Once the connection between the first OSP gateway 120 and the second OSP gateway 125 is established, audio data is transmitted along a connection 180. Thus, an individual on the first telephone 105 is able to have a conversation with an individual on the second telephone 110 via this connection 180. The first and second OSP gateways 120, 125 monitor the VoIP call between the first and second telephones 105, 110. Data such as physical locations of the telephones 105, 110, the amount of time elapsed during the VoIP call, and the time at which the phone call occurred are monitored by each of the OSP gateways 120, 125. The first and second gateways 120, 125 report this call usage information to the OSP server 115 either intermittently during the phone call or after the phone call is completed. Specifically, the first OSP gateway 120 transmits this information to the OSP server 115 via line 155 and the second OSP gateway 125 transmits this information to the OSP server 115 via line 150. Thus, all of this call usage information as well as call authorization, described above, is maintained within a single location. As a result, the OSP server 115 may function as a clearinghouse, call accountant, and inter-domain OSP compatible gateway authorization agent. However, it is important to note that such a system only functions properly if both gateways are OSP compatible (i.e., they operate within an OSP compatible network).

In order for the gateways 120, 125 to be able to communicate properly with the OSP server 115 and other OSP gateways, each gateway must also be OSP compatible. For example, an OSP gateway must be able to analyze an OSP token received from either another gateway or the OSP server 115. Thus, the OSP gateway must be able to decode and decrypt (if necessary) the OSP token. The OSP gateway must be able to generate an authorization request to and read authorization replies from the OSP server 115. Also, the OSP gateway must be able to communicate properly with other OSP gateways in order to establish a call connection.

Typically, OSP gateways have software that enables these types of communications between OSP gateways and OSP servers. This software also contains call-monitoring functionalities such as call usage and authorization. As a result, OSP gateways are able to transmit this information back to an OSP server where it is stored and later retrieved for billing and other purposes. This requirement limits the number of gateways that may interface with the OSP server 115 and connect to other OSP gateways 120, 125.

One significant problem in existing VoIP networks is that there are a large number of non-OSP compatible networks and corresponding gateways currently in operation. These non-OSP networks may not participate in a VoIP connection implementing OSP or interface with an OSP server. Converting these non-OSP networks would require a large amount of work because of the number of different network owners currently in operation. Also, each non-OSP device (e.g., gateway) would need to have software installed that allows it to interface with OSP devices. Such an installation would be very costly due to the large number of non-OSP devices currently in operation and very difficult because of compatibility issues between different service providers. Thus, a user on an OSP network is limited to certain gateways and corresponding telephone numbers to which she/he may place a call using OSP.

It is also important to note that the connection 180 between the first and second OSP gateways 120, 125 is not particularly secure. Specifically, as described above, each gateway 120, 125 is aware of the other gateway's IP address. As a result of this gateway visibility, hackers may be able to access the gateways 120, 125 and the networks 160, 165 on which they reside.

Accordingly it is desirable to provide a voice bridge that allows non-OSP networks to interface with an OSP server and connect with both OSP and non-OSP networks. Additionally, it is also desirable to provide a voice bridge that provides IP masking to OSP gateways during communication.

SUMMARY OF THE INVENTION

An embodiment of the present invention provides a bridge for interfacing networks to establish an OSP compliant session or connection between the networks. A call setup component receives messages from network gateways and establishes a connection between the networks. A packet transport component forwards packets along the connection as a conversation occurs, and an OSP interface provides various OSP functionalities that may be lacking within one or both of the gateways. Additionally, the voice bridge functions as a proxy within the connection by masking the network address of each network gateways from the other gateway(s).

In an embodiment, both the source and the destination networks are OSP compliant. A telephone initiates a voice over Internet protocol (VoIP) connection by transmitting a request to a first OSP gateway. This request typically includes a telephone number corresponding to a destination telephone. The first OSP gateway generates and transmits an OSP message to an OSP server. The OSP message from the first gateway comprises an authorization request. The OSP server replies to the first OSP gateway with routing information to the voice bridge and a first OSP token. Using the routing information and first OSP token, the first gateway sends a call set-up request to the voice bridge to request a connection to the destination gateway. The voice bridge transmits a request to the OSP server for routing information to the destination gateway. The voice bridge receives routing information and a second OSP token. The voice bridge transmits an additional call set-up message and the second OSP token to the destination OSP gateway or gatekeeper. The destination OSP gateway establishes the VoIP connection with the destination telephone. The voice bridge effectively masks the address of both gateways from each other by performing network address translation operations on all packets traveling between the two gateways.

In another embodiment, the source network is OSP compliant and the destination network is non-OSP compliant. The source OSP gateway generates and transmits an authorization request to an OSP server in order to establish a connection with the destination gateway. In response, the source OSP gateway receives routing information and a first OSP token. Using this routing information and first OSP token, the OSP gateway transmits a connection request to the voice bridge. In response, the voice bridge requests the IP address of the destination gateway from the OSP server. The voice bridge receives the destination IP address and a second OSP token from the OSP server. The voice bridge accesses an OSP compatibility table to determine whether the destination gateway is OSP compliant. In this embodiment, the destination gateway is non-OSP compliant. The voice bridge transmits a call set-up message to the non-OSP compliant gateway, but the voice bridge retains the second OSP token. The non-OSP compliant gateway establishes the VoIP connection with the destination telephone. The voice bridge functions as a proxy within the OSP compliant connection by performing OSP functions, such as call monitoring and usage reporting.

In a further embodiment, the source network is non-OSP compliant and the destination network is OSP compliant. A telephone on the source network initiates a VoIP connection by transmitting a request to a non-OSP gateway or gatekeeper. This request typically includes a telephone number corresponding to a destination telephone. The non-OSP gateway or gatekeeper, accessed by the non-OSP gateway, is configured to identify the IP address of a voice bridge corresponding to the destination telephone. After this IP address is determined by address translation or resolution, the non-OSP source gateway transmits a call set-up message to the voice bridge. After receiving this call set-up message, the voice bridge transmits an authorization request to the OSP server. The OSP server replies with routing information to the destination network and an OSP token. The voice bridge accesses an OSP compatibility table to determine whether the destination network is OSP compliant. In this embodiment, the gateway on the destination network is OSP compliant. The voice bridge transmits a call set-up message and the OSP token to the second OSP gateway. The destination OSP gateway establishes the VoIP connection with the destination telephone. The voice bridge does not disclose the IP address of the first network device to the second network device. Thus, the voice bridge functions as a proxy within the OSP compliant connection between the first network and the second network.

In a still further embodiment, both the source and destination networks are non-OSP compliant. A telephone on the source network initiates a VoIP connection by transmitting a request to a non-OSP gateway. This request typically includes a telephone number corresponding to a destination telephone. The non-OSP gateway is configured to identify the IP address of a voice bridge corresponding to the destination telephone. After determining this IP address by address translation or resolution, the non-OSP source gateway transmits a call set-up message to the voice bridge. The voice bridge transmits an authorization request to the OSP server. The OSP server replies with routing information to the destination network and an OSP token. The voice bridge accesses an OSP compatibility table to determine whether the destination gateway is OSP compliant. In this embodiment, the destination gateway is non-OSP compliant. The voice bridge transmits a call set-up message to the non-OSP compliant destination gateway, but the voice bridge retains the OSP token. The non-OSP compliant destination gateway establishes the VoIP connection with the destination telephone. The voice bridge functions as a proxy within the OSP compliant connection by performing OSP functions, such as call monitoring and usage reporting.

The voice bridge enhances network security by masking the source network address from the terminating network and masking the terminating network address from the source network. This masking function is performed both during a call set-up phase and as the conversation is occurring. In order to effectively mask both networks, the voice bridge performs network address translation operations on packets traveling between the two gateways.

The voice bridge also functions as an OSP compatible gateway proxy for non-OSP compatible gateways. In particular, the voice bridge includes an OSP interface that provides OSP functionality when one or both gateways are unable to perform OSP operations independently. For example, the voice bridge performs for a non-OSP compliant network the connection monitoring and reporting services required by the OSP protocol.

Further features of the invention, its nature and various advantages will be more apparent from the accompanying drawings and the following detailed description.

The figures depict a preferred embodiment of the present invention for purposes of illustration only. One skilled in the art will recognize from the following discussion that alternative embodiments of the structures and methods illustrated herein may be employed without departing from the principles of the invention described herein.

DETAILED DESCRIPTION OF THE PREFERRED EMBODIMENTS

A voice bridge for connecting a non-OSP compatible device to an OSP connection and corresponding methods are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

The present invention provides a voice bridge that interfaces networks to establish an OSP compatible VoIP connection. The voice bridge functions as an OSP proxy for non-OSP networks, and interfaces a non-OSP network to an OSP server and another network (either non-OSP or OSP compatible). This voice bridge has two primary functions. First, the voice bridge uses a call setup component to establish an inter-domain connection that is OSP compatible. Second, the voice bridge uses a packet transport component to facilitate and to monitor an OSP compatible communication between gateways on different networks. After the call is completed, the voice bridge may report call usage information to the OSP server. In addition to providing this OSP interface, the voice bridge provides IP masking for both the source and destination gateways.

A. Source OSP Network Connection to Destination OSP Network

Figure 2:
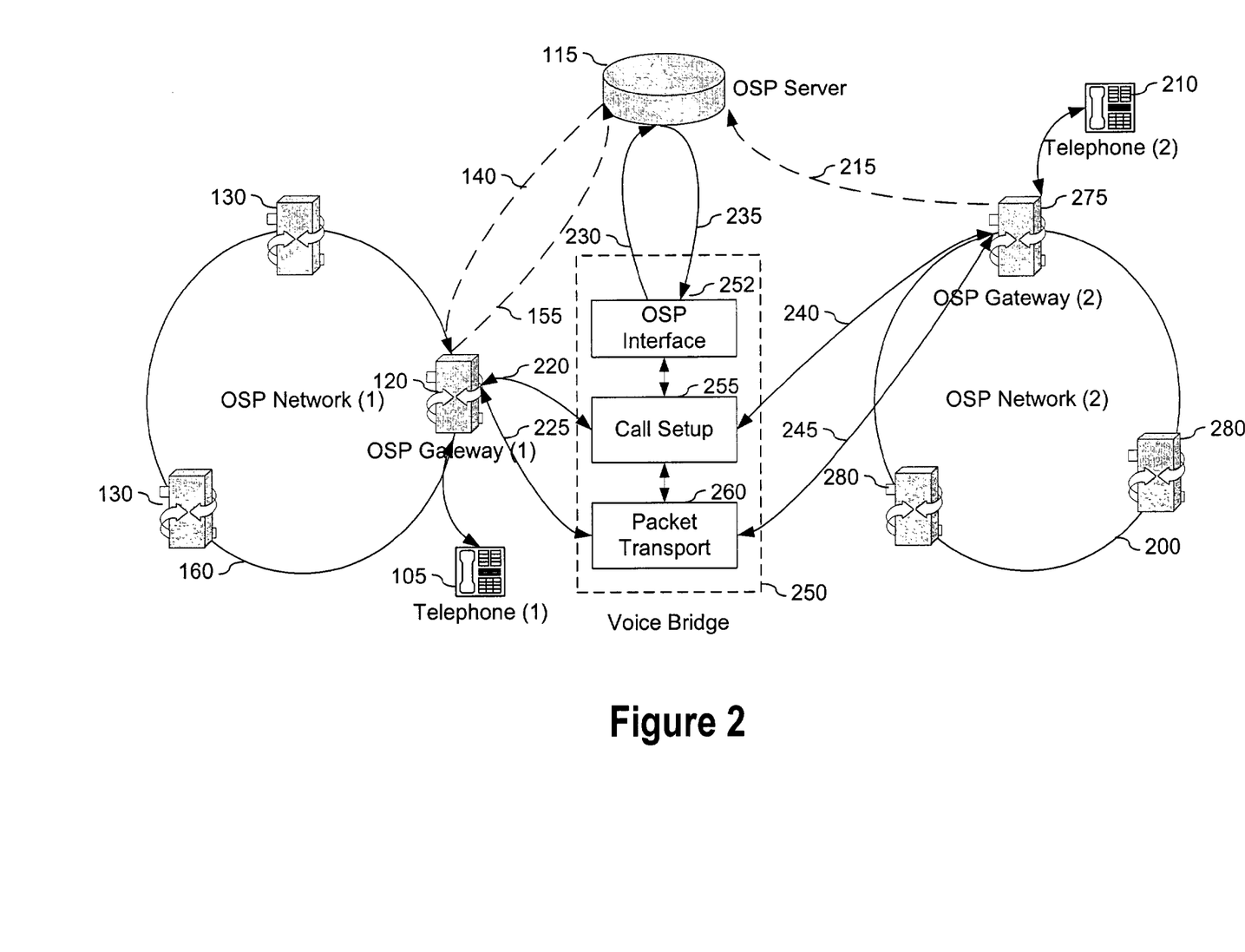
FIG. 2 is an illustration of a VoIP connection between a source OSP network and a destination OSP network using a voice bridge.

FIG. 2 shows an embodiment of a voice bridge 250 that provides IP masking during communication between a first OSP gateway 120 and a second OSP gateway 275. IP masking provides security by hiding the IP address of each gateway 120, 275 from each other during communication. Additionally, the voice bridge facilitates the set-up of the OSP connection.

A telephone 105 initiates a VoIP connection by transmitting a request to the first OSP gateway 120. As previously described, this request typically includes a telephone number corresponding to a destination telephone 210. The first OSP gateway 120 generates and transmits an authorization request to the OSP server 115 via line 155. One skilled in the art will appreciate that the term "line" used throughout the description represents an appropriate communications channel at the transport, network, data link, or physical layer implementing a connection-oriented or connectionless protocol, such as TCP/IP. This request may be an XML formatted message transmitted using Secure Sockets Layer (SSL). In response, the OSP server 115 transmits an authorization reply to the first OSP gateway 120 via line 140. This authorization reply typically includes routing information corresponding to the voice bridge 250 and an OSP token. The routing information may be embedded within an XML message.

The first OSP gateway 120 uses this reply to identify the voice bridge 250 address and to transmit a connection request via line 220. The voice bridge 250 comprises three components: an OSP interface 252, a call setup component 255 and a packet transport component 260. In an embodiment, the OSP interface 252 is coupled to the call setup component 255. The OSP interface 252 functions as an OSP client and facilitates OSP message communication between the OSP server 115 and either the call setup component 255 or the packet transport component 260. For example, the call setup component 255 passes authorization parameters to the OSP interface 252. The OSP interface 252 then formats these parameters into an OSP authorization message and transmits the authorization message via line 230 to the OSP server. The call setup component 255 establishes the connection between the first and second OSP gateways 120, 275. The packet transport component 260 manages voice traffic on the connection between the first and second OSP gateways 120, 275. One skilled in the art will appreciate that the functions of each of the described components can be implemented in general-purpose hardware, application-specific hardware (e.g., a network processor or integrated circuit), software, or firmware. Although embodiments of the present invention have been described in terms of components and modules, one skilled in the art will recognize that the described components and modules are not necessarily discretely implemented in hardware or software. Rather, components and modules are exemplary descriptors of methods and apparatus.

Upon receiving this connection request, the voice bridge 250 transmits a request to the OSP server 115 via line 230. In this request, the voice bridge 250 asks for the IP address of the termination gateway, in this instance, the second OSP gateway 275. According to one embodiment, the voice bridge 250 includes the IP address of the first gateway 120 within a field of the request to the OSP server 115. Accordingly, the OSP server 115 can identify the address of both the voice bridge 250 and the first gateway 120 from data embedded within the request. The OSP server 115 performs a network address translation and routing operation to identify this destination IP address. According to one implementation, the OSP server 115 uses a logical group associated with the voice bridge 250 to determine a telephone connection or path. In yet another implementation, the OSP server 115 uses a logical group associated with the first gateway 120 to determine a telephone connection or path if the first gateway 120 is not an OSP gateway. A logical group is an association of network devices (e.g., telephones, terminals, etc.) and network paths or connections. This logical group may be organized within a table, listing or other organization. This IP address and a second OSP token are transmitted from the OSP server 115 to the voice bridge 250 via line 235. One skilled in the art will appreciate that although line 230 and line 235 are illustrated as separate communications channels, communication between OSP server 115 and voice bridge 250 may occur in a single bi-directional communications channel. After receiving the destination address, the voice bridge 250 identifies whether the terminating IP address is OSP compliant. Specifically, the voice bridge 250 contains an OSP compatibility table that identifies OSP compliant networks by their IP addresses or domains.

As shown in FIG. 2, the second OSP gateway 275 resides within an OSP compliant network 200 and is therefore OSP compliant. The voice bridge 250 uses the OSP compatibility table to identify whether the terminating network and gateway are OSP compliant. In this case, the voice bridge 250 identifies whether the second network 200 is OSP compatible by its IP address received from the OSP server 115. Using the OSP compatibility table, the voice bridge 250 identifies that the second network 200 is OSP compatible and transmits a call set-up message and the second OSP token to the second OSP network 200. This call set-up message may be transmitted to the second OSP gateway 275, as shown, or to a gatekeeper (not shown) on the second OSP network 200. This call set-up message does not disclose the IP address of the first OSP gateway 120, rather it identifies the voice bridge 250 as a proxy, within the connection. Thereafter, a connection is established between the first OSP gateway 120 and the second OSP gateway 275 with the voice bridge 250 functioning as a proxy to mask the gateways' IP addresses from each other. Specifically, this connection is shown as lines 225 and 245. As mentioned above, the packet transport component 260 of the voice bridge 250 manages the voice traffic on this connection during the call.

During the call, both the first and second OSP gateways 120, 275 monitor the call and record OSP call usage information such as call duration, call location, and the time that the call occurred. The first and second OSP gateways 120, 275 report this information to the OSP server 115 either intermittently during the call or after the call has ended. Specifically, the first OSP gateway 120 reports this information via line 155 and the second OSP gateway 275 reports this information via line 215. This information is then stored within the OSP server 115 and used for such things as customer billing and clearinghouse functions.

B. Source OSP Network Connection to Destination Non-OSP Network

Figure 3:
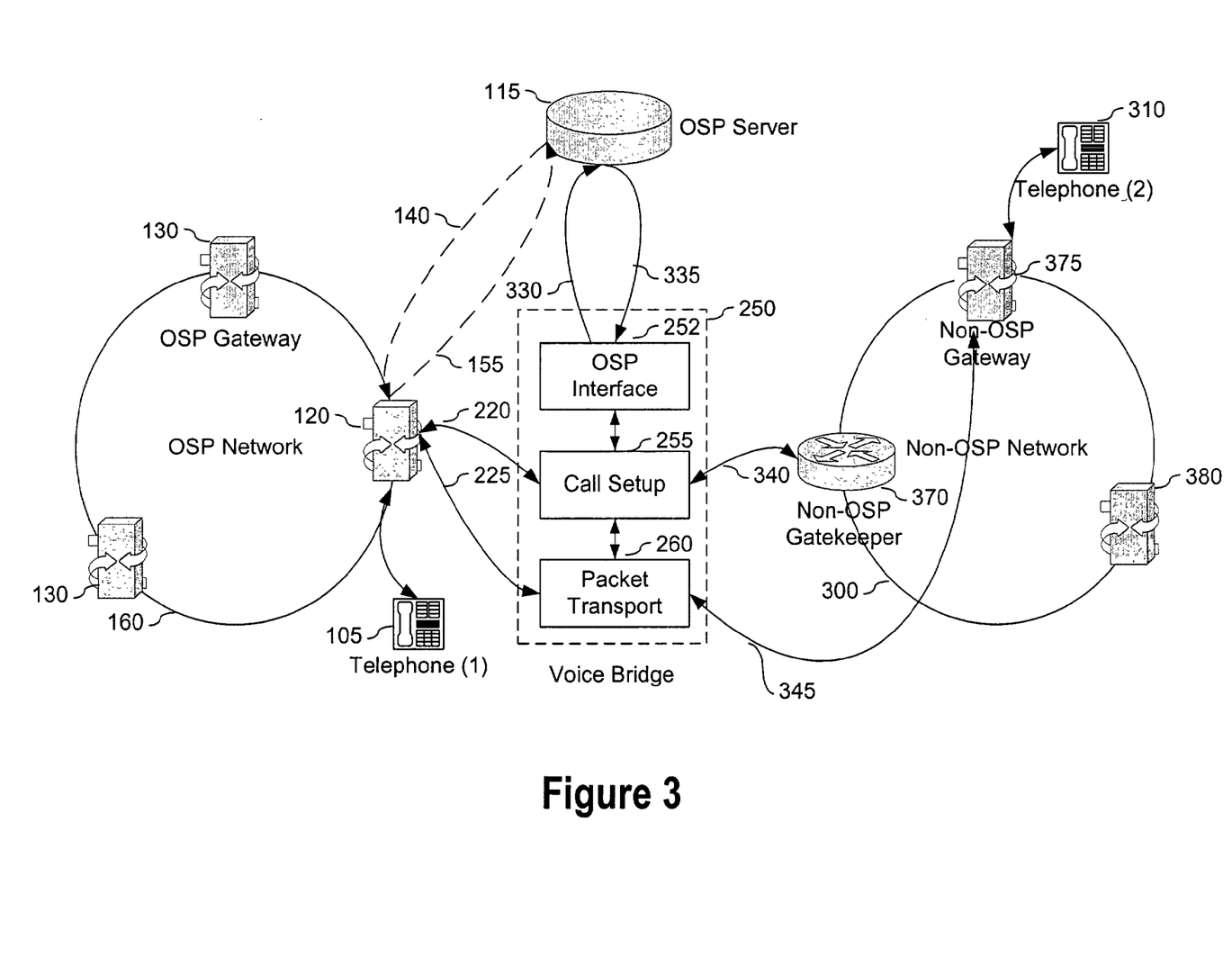
FIG. 3 is an illustration of a VoIP connection between a source OSP network and a destination non-OSP network using a voice bridge.

FIG. 3 illustrates the voice bridge 250 operating within a connection between a source OSP network 160 and a destination non-OSP network 300. As described above, the first telephone 105 initiates the call by sending a request to the first OSP gateway 120. The first OSP gateway 120 communicates with the OSP server 115, as described above, and transmits a call set-up message (e.g., a Q.931 message) and a first OSP token to the voice bridge 250 that it received from the OSP server. The voice bridge 250 retrieves the IP address of a terminating device on a destination network 300 and receives a second OSP token from the OSP server 115. Using an OSP compatibility table, the voice bridge 250 identifies whether the device corresponding to the IP address is OSP compliant. In this case, the device is a gatekeeper 370 on a network 300 that is not OSP compliant.

Upon identifying that the gatekeeper 370 resides on a non-OSP network 300, the voice bridge 250 will act as an OSP proxy for the non-OSP network 300. Specifically, the call setup component 255 in the voice bridge 250 receives from the gatekeeper 370 an IP address corresponding to a terminating destination gateway. In this case, the destination gateway is the non-OSP gateway 375 that is coupled to the telephone 310 on the destination non-OSP network 300. The call setup component 255 transmits a call set-up message to the non-OSP gateway 375 in order to establish a connection between non-OSP gateway 375 and OSP gateway 120. However, the second OSP token that was sent to the destination OSP gateway in FIG. 2 is not transmitted from the voice bridge 250 but maintained within the voice bridge so that it may function as an OSP proxy.

After a connection is established, the voice bridge 250 performs, in proxy, the OSP operations for the destination non-OSP gateway 375 during the call. For example, the voice bridge 250 performs OSP functionality such as monitoring call usage and the location of the destination telephone 310. The OSP interface 252 of the voice bridge 250 facilitates reporting OSP information gathered during a telephone conversation to the OSP server 115 via line 330. The OSP gateway 120 also reports this type of information to the OSP server 115 from its side of the call. This reporting may be done intermittently during the call or after the call is completed. The information gathered by the first OSP gateway 120 and the voice bridge 250 is stored in the OSP server 114 and used for purposes such as billing the call participants.

Figure 4:
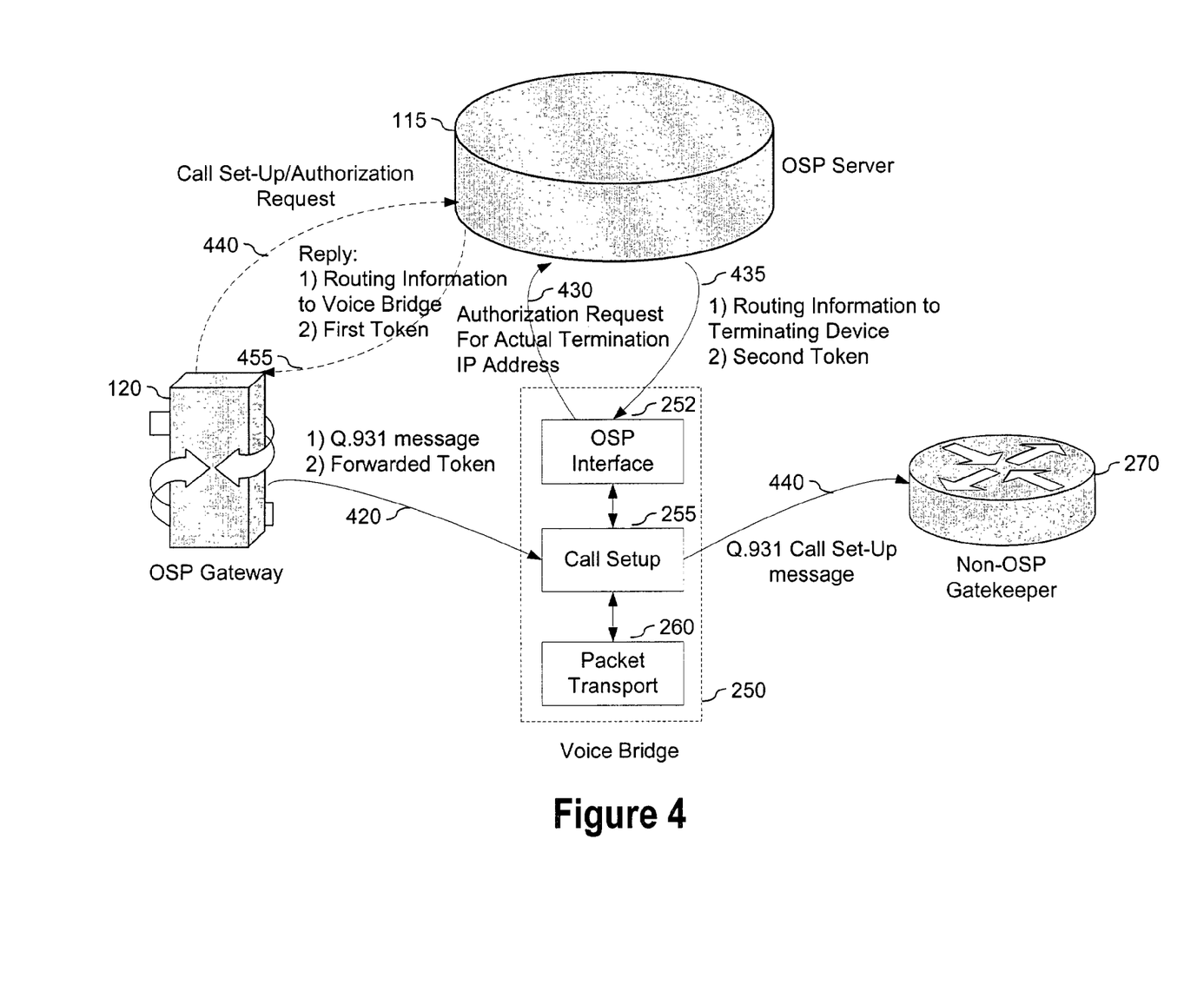
FIG. 4 is a detailed illustration of VoIP call set-up connections between an OSP gateway, a non-OSP gatekeeper and an OSP server.

FIG. 4 is a more detailed illustration of the call set-up process implemented by the voice bridge 250 for a call from an OSP compliant network to a non-OSP compliant network connection. In this example, the OSP gateway 120 initiates the call by sending a call set-up or authorization request to the OSP server 115 via line 430. The OSP server 115 analyzes this request and identifies an appropriate voice bridge 250 that may operate within the desired connection. The OSP server 115 responds to the OSP gateway 120 by transmitting routing information and a first OSP token to the OSP gateway 120 via line 455. Typically, this routing information includes an IP address or other identifier of the voice bridge 250. However, in this example, the terminating IP address of the connection is not sent to the OSP gateway 120 (i.e., the destination IP address is masked) in order to enhance security on the terminating network. In an embodiment, the IP address is encrypted so that the terminating address remains hidden from the source gateway 120. In another embodiment, the OSP server 115 maintains state information to provide the actual termination IP address in response to a request from the voice bridge 250. This embodiment is described below in further detail.

After the OSP gateway 120 has received and processed the reply from the OSP server 115, the OSP gateway 120 transmits a set-up message and forwards the first OSP token to the voice bridge 250 via line 420. For example, this set-up message may be a Q.931 message that defines various call control parameters for the desired connection. The call setup component 255 within the voice bridge 250 receives this set-up message and, in response, communicates with the OSP interface 252 to request routing and authorization from the OSP server 115 in order to connect with a terminating device. In the illustrated embodiment, the OSP interface 252 of the voice bridge 250 sends an authorization request message to the OSP server 115. The OSP server 115 responds with an authorization response message that includes the IP address of the terminating device. The terminating device can be OSP or non-OSP compliant and function as a gateway, gatekeeper, or other networking device. In the illustrated embodiment, the terminating device is non-OSP gatekeeper 270.

In this example, the OSP server 115 responds to the OSP interface 252 of the voice bridge 250 by transmitting routing information regarding the terminating device and a second OSP token via line 435. The OSP interface 252 passes the appropriate parameters to the call setup component 255. The call setup component 255 analyzes the terminating IP address and identifies whether it is OSP compatible. According to one embodiment, the call setup component 255 compares the terminating IP address to an OSP compatibility table that includes IP addresses and corresponding OSP compatibility identifiers for each IP address. The call setup component 255 identifies the terminating IP address in this table and determines whether it is OSP compatible. In an embodiment, if the call setup component 255 identifies the terminating IP address as an OSP compliant device, the second OSP token is forwarded to the OSP compliant device. Forwarding the second OSP token received from the OSP server 115 permits the OSP compliant device to interface directly with the OSP server 115 and allows the OSP server 115 to recognize the terminating OSP compliant device. If, however, the call setup component 255 identifies the terminating IP address as a non-OSP compliant device, then the voice bridge 250 will retain the second OSP token. Because a non-OSP compliant device does not provide OSP functionality, retaining the second token permits the OSP interface 252 of the voice bridge 250 to communicate OSP messages with the OSP server 115 and allows the OSP server 115 to recognize the voice bridge 250.

As shown in FIG. 4, the terminating device in this example is a non-OSP gatekeeper 270. After determining that the gatekeeper 270 is not OSP compliant, the call setup component 255 transmits a set-up message to the gatekeeper 270, via line 440, in order to establish a connection between the OSP gateway 120 and a non-OSP gateway (not shown) to which the non-OSP gatekeeper 270 points. This set-up message may be a Q.931 call set-up message that will establish an H.323 connection. It is important to note that this set-up message contains an address to the voice bridge 250 but does not contain the IP address of the OSP gateway 120. Thus, both source and terminating gateways are masked from each other.

The non-OSP gatekeeper 270 responds to the voice bridge 250 by transmitting a message to the gateway corresponding to the terminating telephone number of the connection. Thereafter, a connection is established between the two gateways and voice packets are transmitted on this connection. As described above, the voice bridge 250 functions as an OSP proxy for the terminating non-OSP gateway 375 and reports corresponding OSP information to the OSP server 115. Also as described above, in an embodiment with an OSP compliant terminating gatekeeper, the voice bridge 250 forwards the second OSP token to the gateway that is identified by the gatekeeper. In this embodiment, the voice bridge 250 provides packet transport functions, but the OSP compliant devices at each end of the call directly interface with the OSP server 115 for reporting, e.g., call usage information. Packet transport component 260 is described below in further detail.

C. Call Setup Component within the Voice Bridge

Figure 5:
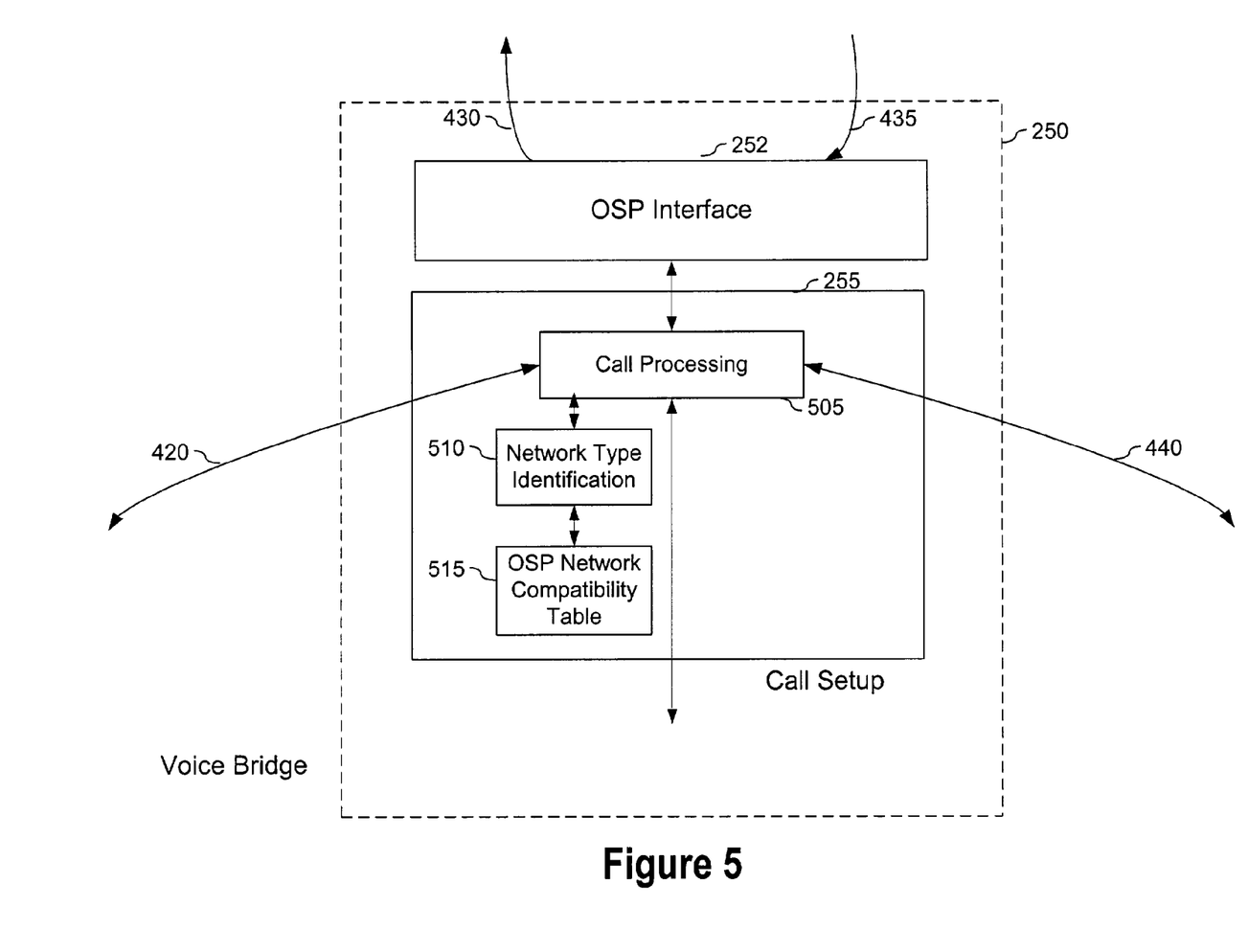
FIG. 5 is a block diagram of a call setup component within a voice bridge.

FIG. 5 illustrates an embodiment of a call setup component 255 that operates within the voice bridge 250 according to the present invention. According to this embodiment, the call setup component 255 comprises a call processing module 505, a network type identification module 510, and an OSP compatibility table 515. As previously described, the call set-up component 255 establishes a connection between a source and terminating gateway and identifies whether the voice bridge 250 will need to function as an OSP proxy within that connection. The call setup component 255 will be described in relation to the above-illustrated OSP gateway to non-OSP gateway connection shown in FIG. 4.

The call processing module 505 receives a call set-up message and an OSP token from the OSP gateway 120 via line 420, and in response, passes authorization and call set-up parameters to the OSP interface 252. The OSP interface 252 formats these parameters into an authorization request and transmits the request to the OSP server 115 via line 430. The OSP interface 252 receives via line 435 an authorization response from OSP server 115, parses the data structure of the OSP message, and passes the received data to the call processing module 505. The authorization response comprises routing information (e.g., an IP address) to a terminating networking device of the connection and a second OSP token used to identify the connection and aid in call usage monitoring. According to one embodiment, the call processing module 505 communicates with the network type identification module 510 to determine whether the terminating network is OSP compliant. To make this determination, the network type identification module 510 further queries an OSP network compatibility table 515. The OSP network capability table 515 comprises a plurality of IP addresses and corresponding OSP compatibility identifier for each IP address. Thus, if the network type identification module 510 finds the terminating IP address within this table 515 then the device corresponding to the terminating IP address is OSP compliant. After this identification is completed, the call processing module 505 initiates a call set-up message to the terminating device.

The call processing module 505 generates a call set-up message to the terminating device via line 440. It is important to note that if the terminating device is OSP compliant then the second OSP token received from the OSP server via line 435 is also transmitted with this call set-up message. However, if the terminating device is not OSP compliant then the second OSP token remains within the voice bridge 250 and may be used to monitor the connection and to report call usage to the OSP server 115.

D. Packet Transport Component within the Voice Bridge

Figure 6:
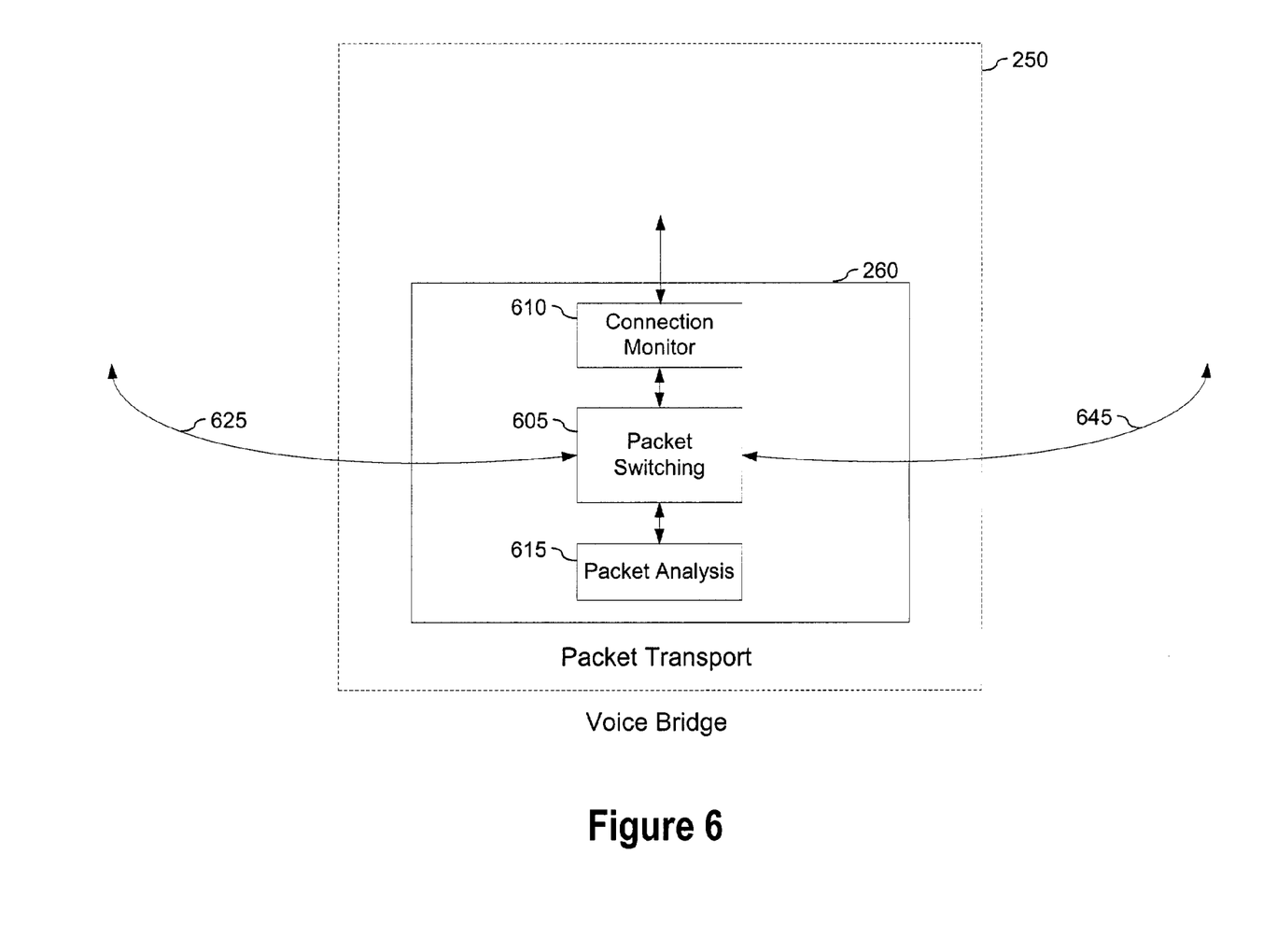
FIG. 6 is a block diagram of a packet transport component within a voice bridge.

FIG. 6 illustrates an embodiment of the packet transport component 260 within the voice bridge 250 according to the present invention. The packet transport component 260 comprises a packet switching module 605, a connection monitor module 610, and a packet analysis module 615. The packet transport component 260 maintains and monitors the connection between the source and terminating gateways.

According to one embodiment, the packet transport component 260 receives a voice packet on line 625. Lines 625, 645 represent a data connection that is established between two network devices. That is, after call set-up messages or other call control messages are exchanged, a data connection is established for at least the duration of the call. One skilled in the art will appreciate that the described connection can be a peer-to-peer connection, multicast, or other type of connection. It is important to note that the packet flow will be described in one direction for simplicity. However, according to this embodiment, the packet flow through the packet transport component 260 occurs on a single bi-directional port interface represented by lines 625 and 645.

The packet analysis module 615 analyzes the received packet in order to determine a destination IP address. In one embodiment, the packet analysis module 615 identifies the destination IP address by parsing the packet header. As a result, the packet analysis module 615 is able to identify the direction of the packet on the established connection 625, 645.

The packet switching module 605 ensures that the packet is translated correctly according to the identified destination IP address. As mentioned above, according to an embodiment of the present invention, voice packets are typically transmitted along the established connection according to the H.323 standard. However, there are different permutations of this standard that may lead to cross-compatibility problems between differing networks. Thus, a packet may need to be altered in some manner by the voice bridge 250 in order to ensure proper communication along a connection between two differing H.323 networks. The packet switching module 605 provides this packet translation. A detailed description of such a packet translation system and method is application Ser. No. 60/329,015, entitled "Network Type Identification for VoIP," filed Oct. 12, 2001, which is hereby incorporated by reference in its entirety. Additionally, the packet switching module 605 is also responsible for the actual physical switching of the packet along the port. An example of this physical switching is a simple store and forward operation performed on a packet.

The connection monitor module 610 is activated if at least one gateway in the connection is not OSP compatible. Specifically, the connection monitor module 610 operates as an OSP proxy for either or both non-OSP gateways within the connection. The connection monitor module 610 records call usage operations such as, but not limited to, duration of the telephone connection, the location of attached gateways, and the time of day the connection was initiated. The connection monitor module 610 stores this information in a data structure and passes the data structure to the OSP interface 252 (via call processing module 505), which transmits it to the OSP server 115. This reporting process may occur intermittently during a telephone call or after the call has ended. Once this information is transmitted to the OSP server 115, service providers may use this information for customer billing, call analysis and other functions.

E. Source Non-OSP Network Connection to Destination OSP Network

Figure 7:
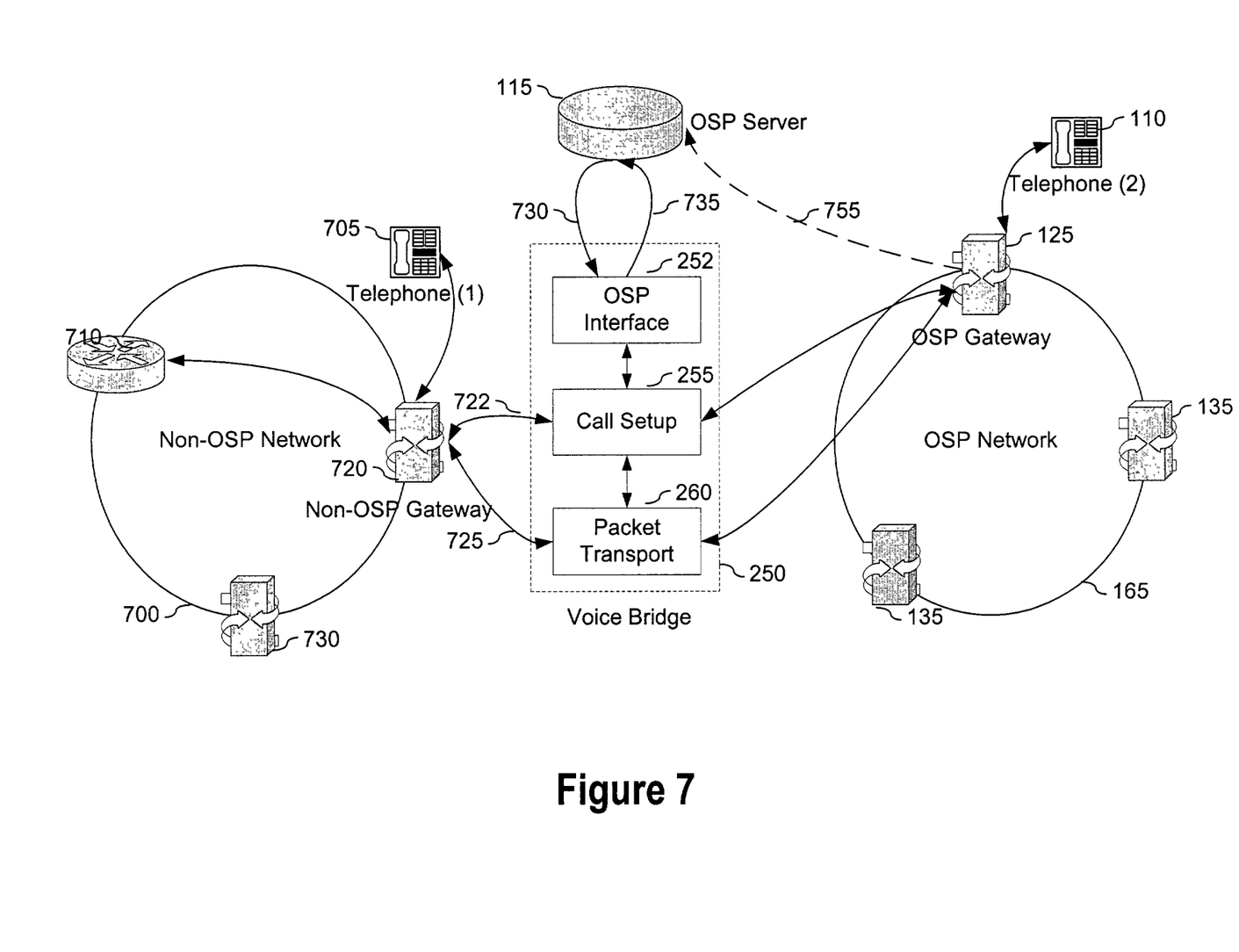
FIG. 7 is an illustration of a VoIP connection between a source non-OSP network and a destination OSP network using a voice bridge.

FIG. 7 illustrates the voice bridge 250 operating within a connection between a source non-OSP network 700 and a destination OSP network 165. In this example, the voice bridge 250 functions as an OSP proxy for a source non-OSP gateway 720 while providing IP masking for both source and terminating gateways 720, 125.

A first telephone 705 initiates a VoIP connection by transmitting a request to the non-OSP gateway 720 that resides on a non-OSP network 700. This non-OSP network 700 may have other gateways 730 and gatekeepers 710 as well. As previously described, this request typically includes a telephone number corresponding to a destination telephone 110. In one embodiment, the non-OSP gateway 720 retrieves routing information from the gatekeeper 710 resident on the non-OSP network 700. This gatekeeper 710 performs an address translation and identifies an IP address of the voice bridge 250 corresponding to the telephone number transmitted by the first telephone 705. Gatekeeper 710 is configured to identify the appropriate voice bridge 250 by using an address resolution table, an administrative domain, or an other configuration mechanism. In a different embodiment, this address translation may be performed within the non-OSP gateway 720. Once the correct voice bridge 250 has been identified, the non-OSP gateway 720 begins a call set-up process.

The non-OSP gateway 720 generates and transmits a call set-up message to the voice bridge 250. This call set-up message may be a Q.931 message used to set up an H.323 connection. Specifically, this call set-up message is received by the call setup component 255 via line 722. In response, the voice bridge 250 transmits an authorization request to the OSP server 115 requesting routing information to the destination gateway and OSP authorization via line 735. The OSP server 115 responds to this request by transmitting the destination gateway routing information (e.g., IP address) and an OSP token for the desired connection. After receiving this response, the voice bridge 250 identifies whether the network corresponding to the received routing information is OSP compliant.

As previously described, the voice bridge 250 may use the OSP compatibility table 515 to make this identification. In this embodiment, after the voice bridge 250 has identified that the destination network 165 is OSP compliant, then the voice bridge 250 transmits a call set-up message and forwards the OSP token to a device on the OSP network. As shown in FIG. 7, this device may be the OSP gateway 125. However, a gatekeeper (not shown) may initially be contacted in order to identify the particular gateway on which the connection may terminate. In either case, the call set-up message and OSP token are eventually transmitted to the terminating OSP gateway 125. An example of this call set-up message is a Q.931 message. As in the other embodiments described above, the voice bridge 250 masks the IP addresses of both the source and terminating gateways from each other. That is, the source gateway does not have visibility of the terminating gateway IP address, and the destination gateway does not have visibility of the source gateway IP address.

After the connection is established, voice packets travel along the connection during the telephone call. According to an embodiment, this voice traffic follows the H.323 standard. The voice bridge 250 operates as an OSP proxy for the source non-OSP gateway 720 by performing OSP related operations for the non-OSP gateway 720. As previously described, the operations relate generally to call usage and reporting. The OSP gateway 125 monitors and transmits call usage reports to the OSP server 115 via line 755. In this transmission, the OSP token is used by the OSP gateway 125 to communicate properly with the OSP server 115. The voice bridge 250 performs the same type of OSP functionality for the non-OSP gateway 720 and transmits call usage reports to the OSP server 115 vial line 735. The transmissions to the OSP server from both the voice bridge 250 and the OSP gateway 125 may occur intermittently during the telephone call or after the telephone call has been completed.

F. Source Non-OSP Network Connection to Destination Non-OSP Network

Figure 8:
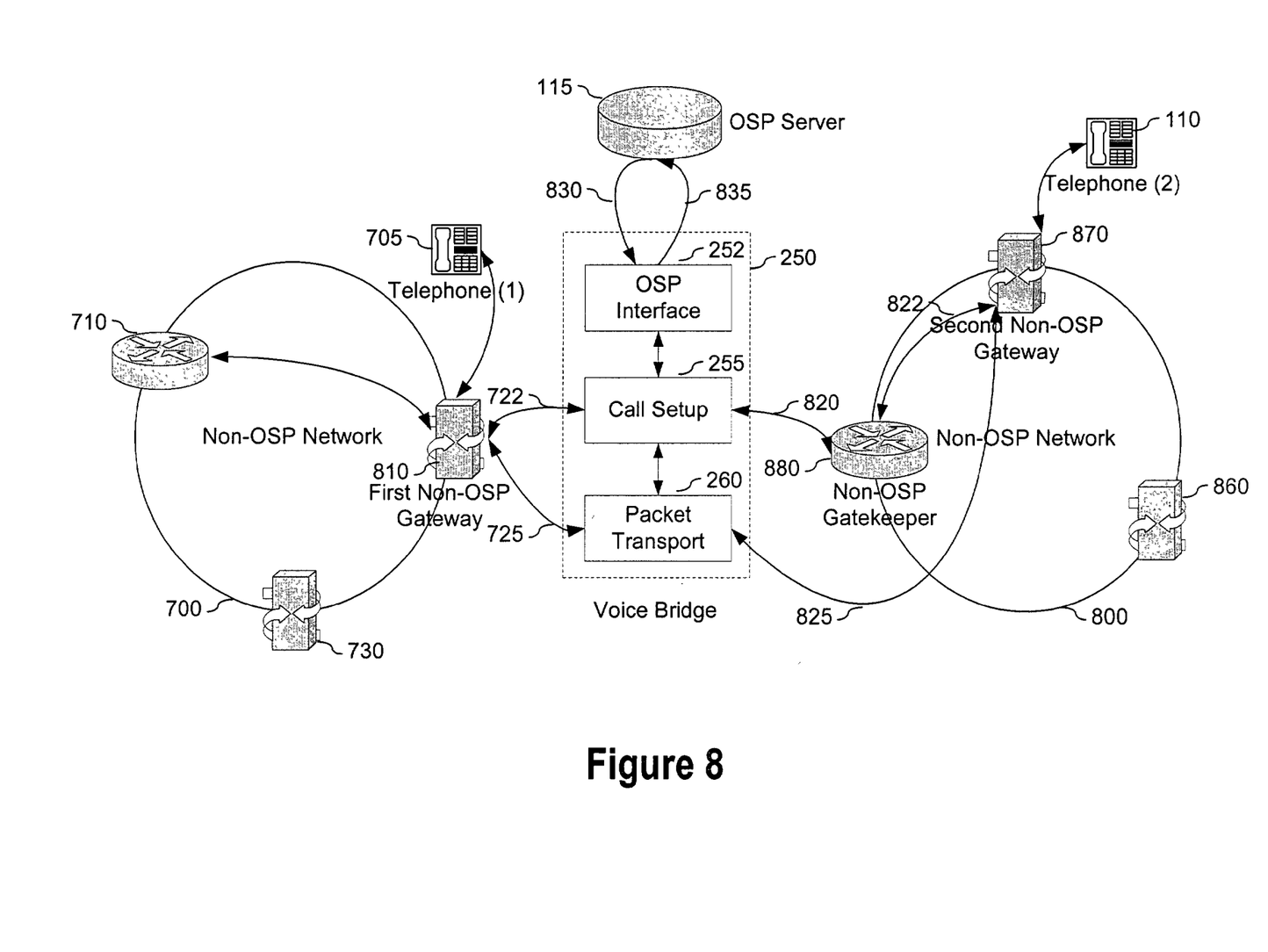
FIG. 8 is an illustration of a VoIP connection between a source non-OSP network and a destination non-SOP network using a voice bridge.

FIG. 8 illustrates the voice bridge 250 operating within a connection between a source non-OSP network 700 and a destination non-OSP network 800. In this example, the voice bridge 250 functions as an OSP proxy for both source non-OSP gateway 810 and terminating non-OSP gateway 870 while providing IP masking for both source and terminating gateways 810, 870.

As previously described above, the first telephone 705 initiates a VoIP connection by transmitting a request to a first non-OSP gateway 810 that resides on a non-OSP network 700. This non-OSP network 700 may have other gateways 730 and gatekeepers 710 as well. As previously described, this request typically includes a telephone number corresponding to a destination telephone 110. In one embodiment, the first non-OSP gateway 810 retrieves routing information from the gatekeeper 710 resident on the non-OSP network 700. This gatekeeper 710 performs an address translation and identifies an IP address of the voice bridge 250 corresponding to the telephone number transmitted by the first telephone 705. The address resolution mechanism is described above in further detail. In a different embodiment, this address translation may be performed within the first non-OSP gateway 810. Once the correct voice bridge 250 has been identified, the first non-OSP gateway 810 begins a call set-up process.

The first non-OSP gateway 810 generates and transmits a call set-up message to the voice bridge 250. Specifically, this call set-up message is received by the call set-up component 255 via line 722. In response, the voice bridge 250 transmits an authorization request to the OSP server 115 requesting routing information to a gatekeeper or destination gateway, and an OSP token via line 835. The OSP server 115 responds to this request by transmitting the destination gateway routing information (e.g., IP address) and an OSP token for the desired connection via line 830. After receiving this response, the voice bridge 250 identifies whether the network corresponding to the received routing information is OSP compliant.

As previously described, the voice bridge 250 may use the OSP compatibility table 515 to make this identification. In this particular embodiment, the voice bridge 250 identifies the destination network 800 as not being OSP compliant. Thus, the voice bridge 250 will act as an OSP proxy for both source and terminating gateways 810, 870. The voice bridge 250 will need to establish a connection to the correct gateway on the non-OSP network 800. In order to set-up this connection, the correct terminating gateway on the non-OSP gateway 800 is identified. This identification may be done by requesting the address of the terminating non-OSP gateway from a gatekeeper 880. The gatekeeper 880 returns the address of the terminating gateway, in this case the second non-OSP gateway 870, to the voice bridge 250 via line 820.

The voice bridge 250 transmits a call set-up message to the second non-OSP gateway 870 but withholds the OSP token received from the OSP server 115. An example of a call set-up message is a Q.931 message. Thereafter, a connection 825 between the voice bridge 250 and the second non-OSP gateway 870 is established. Voice packets may then be transmitted on this connection 725, 825 between the first and second non-OSP gateways 810, 870. The voice packets may be transmitted according to the H.323 standard.

The voice bridge 250 monitors the connection 725, 825 for call usage aspects including location of the source and terminating gateways 810, 880, the duration of the telephone call and the time of day the call occurred. The voice bridge 250 reports this call usage information to the OSP server 115 via line 835. This reporting may be done after the phone call is completed or intermittently during the phone call.

G. Exemplary Flow Diagrams

Figure 9:
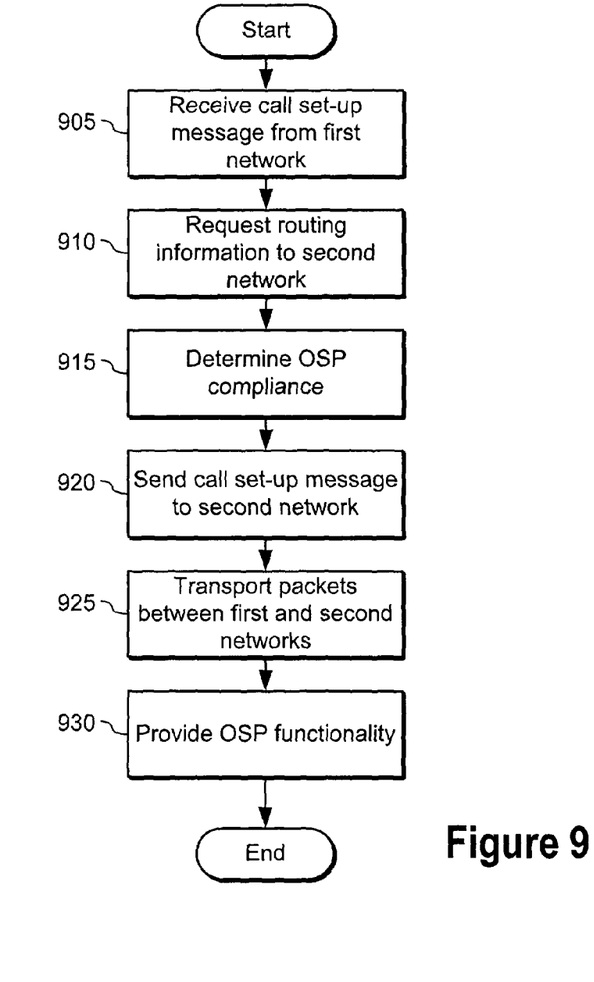
FIG. 9 is a flow diagram for an OSP intelligent voice bridge.

FIG. 9 is a flow diagram for an OSP intelligent voice bridge. In an embodiment of the present invention, the voice bridge 250 receives a call set-up message from a first network 905. In response, the voice bridge 250 requests routing information to a second network 910 from an OSP server 115. The OSP server 115 performs authorization, authentication, and clearinghouse functionalities for a connection. The OSP compliance of each of the first and second networks is determined 915. Next, the voice bridge 250 sends a call set-up message to a second network 920. As described above in an embodiment, call set-up messages or other call control operations conform to Q.931 standards, but one skilled in the art will appreciate that other message formats can be used. After call set-up is complete, the voice bridge 250 transports packets between the first and the second networks 925. More specifically, the first network sends its outgoing voice packets to the voice bridge 250. The voice bridge 250 forwards the packets received from the first network to the second network. Similarly, the second network sends its outgoing packets to the voice bridge 250, which the voice bridge 250 then forwards to the first network. In this manner, the voice bridge 250 operates as a proxy in establishing a data connection between the first and the second networks, and effectively masks each IP address during the telephone conversation.

Further, the voice bridge 250 provides OSP functionality 930. In an embodiment, OSP functionality includes performing OSP client services to report call usage operations, such as call duration, to the OSP server 115. The OSP server 115 uses call usage operations for customer billing, network authorization, or other clearinghouse purposes. Depending on whether the first and second networks are OSP compliant, the voice bridge 250 provides OSP functionality for the first network, the second network, or both the first and the second networks. As described above in an embodiment, if the first network is an OSP compliant network, then the voice bridge 250 does not provide OSP functionality for the first network. Likewise, if the second network is OSP compliant, then the voice bridge 250 does not provide OSP functionality for the second network. However, if either the first or the second networks is non-OSP compliant, then the voice bridge 250 provides OSP functionality for the non-OSP network or networks. Although embodiments of the present invention have been described as involving a peer-to-peer network connection, the voice bridge 250 includes a plurality of port interfaces and a plurality of logical port numbers (e.g., transmission control protocol (TCP) or user datagram protocol (UDP) source and destination ports) to support a plurality of concurrent connections, e.g., peer-to-peer, multicast, broadcast, or other connections from discrete or non-discrete networks.

Figure 10:
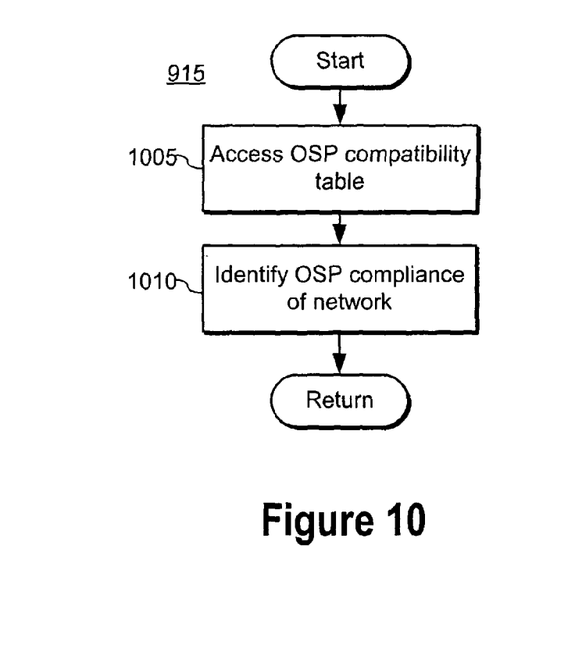
FIG. 10 is a flow diagram for one method for determining OSP compliance.

FIG. 10 is a flow diagram for one method for determining OSP compliance. FIG. 10 illustrates further details of FIG. 9, step 915. The voice bridge 250 accesses an OSP compatibility table 1005 and identifies whether a network is OSP compliant 1010. As described above in an embodiment, the OSP compatibility table includes IP addresses and corresponding OSP compliance identifiers. In an embodiment, the call processing module 505 uses the OSP compatibility table to determine whether the second or destination network is OSP compliant. Depending on whether the source or destination networks are OSP compliant, the voice bridge 250 enables OSP functionality accordingly. In another embodiment, the call processing module 505 identifies the source network as OSP compliant because of the OSP token received in connection with the incoming call set-up message from the source network.

Figure 11:
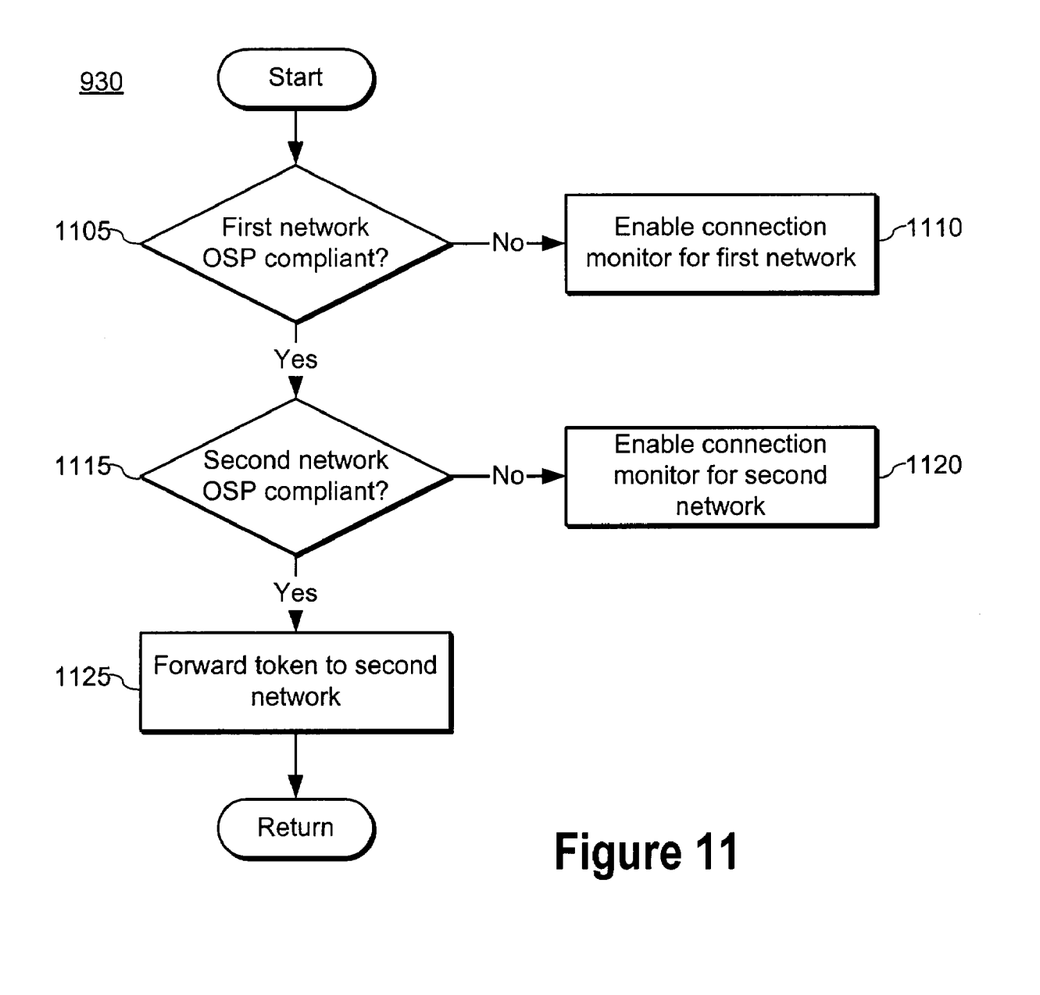
FIG. 11 is a flow diagram for providing OSP functionality.

FIG. 11 is a flow diagram for providing OSP functionality. FIG. 11 illustrates further details of FIG. 9, step 930. If the first or source network is non-OSP compliant 1105, then the voice bridge 250 enables connection monitoring for the first network 1110. Further details of the connection monitor 610 and associated call usage reporting are described above. If the second or destination network is non-OSP compliant 1115, then the voice bridge 250 enables connection monitoring for the second network 1120. However, if the second network is OSP compliant, an OSP token is forwarded to the second network 1125 to enable the second network to interface directly with the OSP server 115.

While the present invention has been described with reference to certain preferred embodiments, those skilled in the art will recognize that various modifications may be provided. Variations upon and modifications to the preferred embodiments are provided for by the present invention. Although the present invention has been described in terms of operating as a voice bridge or within a voice bridge, the invention should not be limited to such a description. In particular, the present invention may operate on or in the form of any network device (including routers, switches, proxies, etc.) that may be positioned within a network connection. One skilled in the art will also recognize that in the described embodiments a source network may be defined as a first network or second network. Similarly, a destination network may be defined as a first network or second network.

What is claimed is:

1. An open settlement protocol (OSP) networking proxy apparatus for connecting a first network and a second network, the proxy apparatus comprising:
a call setup component configured to be coupled to the first network and the second network further configured to establish a connection on which the first network and the second network communicate and are masked from each other, wherein at least one of the first network and the second network is non-OSP compliant;
an OSP compatibility table coupled to a network type identification module to determine whether the second network is OSP compliant;
a packet transport component configured to be coupled to the first network and the second network, and coupled to the call setup component, the packet transport configured to switch packets on the connection; and
an OSP interface coupled to the call setup component and configured to provide OSP functionality for at least one of the first network and the second network by communicating with an OSP server.

2. The apparatus of claim 1 wherein the call set-up component further comprises:
a call processing module adapted to receive and to process a call set-up message from the first network; and the network type identification module coupled to the call processing module that determines whether the second network is OSP compliant.

3. The apparatus of claim 2 further comprising:
the OSP compatibility table adapted to store at least one network identifier and OSP compliance information corresponding to at least one network.

4. The apparatus of claim 1 wherein the OSP interface is configured to receive an OSP message, from an OSP server, to facilitate creation of an OSP compliant connection.

5. The apparatus of claim 4 wherein the OSP message from the OSP server comprises routing information corresponding to the second network.

6. The apparatus of claim 1 wherein the OSP interface is configured to report call usage information to an OSP server.

7. The apparatus of claim 1 wherein the call setup component receives a first call set-up message from the first network, determines a termination address, and sends a second call set-up message to the second network.

8. The apparatus of claim 7 wherein the OSP interface communicates with an OSP server to determine the termination address.

9. The apparatus of claim 4 wherein the OSP message from the OSP server comprises an OSP token.

10. The apparatus of claim 4 wherein the OSP message comprises an authorization response.

11. The apparatus of claim 2 wherein the call set-up message from the first network comprises a Q.931 message.

12. The apparatus of claim 2 wherein the call set-up message from the first network comprises an OSP token.

13. The apparatus of claim 1 wherein the call setup component transmits a second call set-up message to the second network to establish the connection.

14. The apparatus of claim 13 wherein the second call set-up message comprises a Q.931 message.

15. The apparatus of claim 1 wherein the packet transport component further comprises:
a packet switching module that provides network address translation functionality to ensure compatibility between the first network and the second network;
a packet analysis module, coupled to the packet switching module, that identifies a packet flow direction on the established connection; and
a connection monitor module, coupled to the packet switching module, that monitors the established connection and records call usage operations.

16. The apparatus of claim 15 wherein the packet flow direction is determined by parsing a packet header to identify a destination IP address.

17. The apparatus of claim 15 wherein the packet switching module is adapted to conform packets to a H.323 standard.

18. The apparatus of claim 15 wherein the packet switching module is adapted to identify a destination IP address from a source address in a packet header, and responsive to the destination IP address, modify the packet header to include the identified destination IP address.

19. The apparatus of claim 15 wherein the packet switching module is adapted to store and to forward a packet.

20. The apparatus of claim 15 wherein the call usage operations comprise at least one of connection duration, gateway location, and telephone location.

21. The apparatus of claim 15 wherein the connection monitor passes recorded call usage operations to the OSP interface.

22. The apparatus of claim 15 wherein the connection monitor intermittently reports call usage operations to the OSP interface.

23. The apparatus of claim 1 wherein the call set-up component is further configured to receive routing information to a terminating device.

24. A method for providing open settlement protocol (OSP) functionalities on a networking device, using an OSP proxy, the method comprising steps of:
    receiving a call set-up message from a first network, wherein the call set-up message is destined to a second network, and at least one of the first network and the second network is non-OSP compliant;
    sending an OSP message to an OSP server requesting routing information for the second network;
    accessing an OSP compatibility table to identify whether the second network is OSP compliant;
    masking the first network from the second network; and
    providing OSP functionality on the networking device using the OSP proxy for at least one of the first network and the second network.

25. The method of claim 24 further comprising the step of sending a second call set-up message to the second network to establish a connection between the first and the second network.

26. The method of claim 24 wherein the OSP message comprises an authorization request.

27. The method of claim 24 wherein the step of accessing further comprises steps of:
    identifying whether the second network is OSP compliant from the OSP compliance information in the OSP compatibility table, wherein the OSP compatibility table comprises at least one network identifier and OSP compliance information corresponding to at least one network.

28. The method of claim 25 wherein the step of requesting further comprising the step of receiving an OSP message from an OSP server to facilitate the creation of the established connection.

29. The method of claim 28 wherein the OSP message from the OSP server comprises routing information corresponding to the second network.

30. The method of claim 28 wherein the OSP message from the OSP server comprises an OSP token.

31. The method of claim 24 wherein the first call set-up message comprises a Q.931 message.

32. The method of claim 24 wherein the first call set-up message comprises an OSP token.

33. The method of claim 25 wherein the second call set-up message comprises a Q.931 message.

34. The method of claim 25 further comprising steps of:
    translating packets to ensure compatibility between the first network and the second network;
    identifying a packet flow direction on the established connection; and
    monitoring the established connection and recording call usage operations.

35. The method of claim 34 wherein the step of identifying further comprises the step of determining a destination IP address in a packet header.

36. The method of claim 34 wherein the step of translating further comprises the step of conforming packets to a H.323 standard.

37. The method of claim 34 wherein the step of translating further comprises the steps of:
    identifying a destination IP address; and
    responsive to the destination IP address, conforming packets to a H.323 standard.

38. The method of claim 25 further comprising the step of switching packets on the established connection.

39. The method of claim 34 wherein the call usage operations comprise at least one of connection duration, gateway location, and telephone location.

40. The method of claim 34 wherein the step of monitoring further comprises the step of transmitting recorded call usage operations to an OSP server.

41. The method of claim 34 wherein the step of monitoring further comprises the step of intermittently reporting call usage operations to an OSP server.

42. The method of claim 24 wherein at least one of the first network and the second network is OSP compliant.

43. The method of claim 24 wherein at least one of the first network and the second network is non-OSP compliant.

\* \* \* \* \*